United States Patent
Donderici et al.

(10) Patent No.: US 10,241,226 B2
(45) Date of Patent: Mar. 26, 2019

(54) DOWNHOLE GRADIOMETRIC RANGING UTILIZING TRANSMITTERS AND RECEIVERS HAVING MAGNETIC DIPOLES

(71) Applicant: Halliburton Energy Services, Inc., Houston, TX (US)

(72) Inventors: Burkay Donderici, Houston, TX (US); Baris Guner, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 214 days.

(21) Appl. No.: 15/025,738

(22) PCT Filed: Sep. 18, 2014

(86) PCT No.: PCT/US2014/056296
§ 371 (c)(1),
(2) Date: Mar. 29, 2016

(87) PCT Pub. No.: WO2015/047865
PCT Pub. Date: Apr. 2, 2015

(65) Prior Publication Data
US 2016/0216397 A1    Jul. 28, 2016

Related U.S. Application Data

(60) Provisional application No. 61/884,688, filed on Sep. 30, 2013.

(51) Int. Cl.
*E21B 47/022* (2012.01)
*G01V 3/26* (2006.01)
(Continued)

(52) U.S. Cl.
CPC .................. *G01V 3/26* (2013.01); *E21B 7/06* (2013.01); *E21B 47/02216* (2013.01); *E21B 47/0905* (2013.01); *G01V 3/28* (2013.01)

(58) Field of Classification Search
CPC . E21B 7/04; E21B 7/043; E21B 7/046; E21B 7/06; E21B 47/022; E21B 47/02216; E21B 47/0905
(Continued)

(56) References Cited

U.S. PATENT DOCUMENTS

| 4,372,398 A | 2/1983 | Kuckes |
| 5,589,775 A | 12/1996 | Kuckes |

(Continued)

FOREIGN PATENT DOCUMENTS

| RU | 2471972 C1 | 1/2013 |
| WO | WO 2005/057242 A2 | 6/2005 |
| WO | WO 2012/009375 A1 | 1/2012 |

OTHER PUBLICATIONS

Bittar, et al., "New Logging-While-Drilling Ranging Technique for SAGD: Theory and Experiment," Society of Petroleum Engineers Annual Technical Conference and Exhibition, Oct. 8-10, 2012, 10 pages, San Antonio, Texas.
(Continued)

*Primary Examiner* — Brad Harcourt
*Assistant Examiner* — David Carroll
(74) *Attorney, Agent, or Firm* — Haynes and Boone, LLP (57) ABSTRACT

A ranging system utilizes gradiometric data to determine the distance between a first and second well without any knowledge or involvement of the borehole or formation characteristics. In general, this is achieved by deploying a downhole assembly comprising transmitters and receivers having magnetic dipoles, along with bucking receivers positioned between the transmitters and receivers, wherein the gradient field is measured in a radial direction along the downhole assembly.

21 Claims, 8 Drawing Sheets

(51) Int. Cl.
*E21B 47/09* (2012.01)
*G01V 3/28* (2006.01)
*E21B 7/06* (2006.01)

(58) Field of Classification Search
USPC .................................................. 175/40, 45
See application file for complete search history.

(56) References Cited

U.S. PATENT DOCUMENTS

| 6,326,784 | B1 | 12/2001 | Ganesan et al. | |
| 2010/0044108 | A1* | 2/2010 | Bespalov | E21B 47/022 |
| | | | | 175/24 |
| 2011/0088890 | A1 | 4/2011 | Clark | |
| 2011/0308794 | A1* | 12/2011 | Bittar | E21B 47/02216 |
| | | | | 166/254.2 |
| 2012/0109527 | A1 | 5/2012 | Bespalov et al. | |

OTHER PUBLICATIONS

Grills, et al. "Magnetic Ranging Technologies for Drilling Steam Assisted Gravity Drainage Well Pairs and Unique Well Geometries—A Comparison of Technologies," Society of Petroleum Engineers Thermal Operations and Heavy Oil Symposium and International Horizontal Well Technology Conference, Nov. 4-7, 2002, 8 pages, Calgary, Alberta, Canada.

International Search Report and the Written Opinion of the International Search Authority, or the Declaration, dated Dec. 26, 2014, PCT/US2014/056296, 15 pages, ISA/KR.

Kuckes, et al. "An Electromagnetic Survey Method for Directionally Drilling a Relief Well," Society of Petroleum Engineers Journal, Jun. 1984, pp. 269-274.

Office Action and Search Report issued for Russian Patent Application No. 2016104853 dated Jul. 21, 2017, 7 pages.

* cited by examiner

DOWNHOLE GRADIOMETRIC RANGING UTILIZING TRANSMITTERS AND RECEIVERS HAVING MAGNETIC DIPOLES

PRIORITY

The present application is a U.S. National Stage patent application of International Application No. PCTUS2014/056296, filed on Sep. 18, 2014, which claims priority to U.S. Provisional Patent Application No. 61/884,688 entitled, "DOWNHOLE GRADIOMETRIC RANGING UTILIZING TRANSMITTERS & RECEIVERS HAVING MAGNETIC DIPOLES," filed Sep. 30, 2013, also naming Donderici et al. as inventors, the disclosures of which are hereby incorporated by reference in their entirety.

FIELD OF THE DISCLOSURE

The present disclosure relates generally to downhole ranging and, more specifically, to a ranging assembly utilizing magnetic dipole transmitters and receivers which analyze gradiometric data to determine and track the relative location of multiple wellbores.

BACKGROUND

Determining the position and direction of a conductive pipe (metallic casing, for example) accurately and efficiently is required in a variety of downhole applications. Perhaps the most important of these applications is the case of a blown out well in which the target well must be intersected very precisely by a relief well in order to stop the blowout. Other important applications include drilling of a well parallel to an existing well in Steam Assisted Gravity Drainage ("SAGD") systems, avoiding collisions with other wells in a crowded oil field where wells are drilled in close proximity to each other and tracking an underground drilling path using a current injected metallic pipe over the ground as a reference.

A number of conventional approaches have attempted to provide solutions to this problem. In one method, current is induced on a target casing by transmitting electromagnetic waves via coil antennas. This induced current in turn causes the casing to radiate a secondary electromagnetic field. The amplitude of this secondary field can be used to determine the distance to the target casing. However, since the amplitude of the field is strongly dependent on the properties of the casing and the formation, the accuracy of this method can remain low.

In another conventional approach, an electrode type source is used to induce current on the target casing to thereby generate a magnetic field. Gradient of the magnetic field radiated by the target casing, in addition to the magnetic field itself, is measured in this approach. By using a relationship between the magnetic field and its gradient, an accurate ranging measurement is made. However, since electrodes are sensitive to the resistive oil-based muds, the electrode must be positioned in direct contact with the formation to inject the current. As a result, high contact losses may occur, or ohmic losses in highly resistive formations may reduce the range of the tool.

Accordingly, there is a need in the art for improved downhole ranging techniques.

DESCRIPTION OF ILLUSTRATIVE EMBODIMENTS

Illustrative embodiments and related methodologies of the present disclosure are described below as they might be employed in a ranging system and method utilizing magnetic dipole transmitters/receivers to analyze gradiometric data and thereby drill and/or track the relative location of wellbores. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, illustrative embodiments and methodologies of the present disclosure describe ranging systems that utilize gradiometric data to determine the distance between a first and second well without any knowledge or involvement of the borehole or formation characteristics, wherein the gradient field is measured in a radial direction along the downhole assembly. In general, this may be achieved by deploying a downhole assembly comprising magnetic dipole transmitters and receivers, along with bucking receivers positioned between the transmitters and receivers. The magnetic dipoles may be embodied in a variety of ways, including, for example, coils, solenoids or magnetometers. An electromagnetic field is generated by the transmitters and induced onto the target casing to thereby produce a secondary electromagnetic field along the casing. A sum of this secondary magnetic field in addition to the direct field coming from the transmitter is measured by a set of receivers radially separated along the axis of the downhole assembly. The bucking receivers are configured to have opposite polarization to the main receiver set to thereby eliminate the direct signal between the transmitter and receiver. Using the measurements of the magnetic field from different receivers in a receiver set, the gradient of the magnetic field is calculated. Thereafter, utilizing various algorithms described herein, processing circuitry located on the downhole assembly (or at a remote location) analyzes the gradient field to determine the distance and direction to the target casing.

Although the present disclosure may be utilized in a variety of applications (wireline, for example), the following description will focus on applications for accurately, and reliably positioning a well being drilled, the "injector" well (i.e., second well), with respect to a nearby target first well, usually the producer well, so that the injector well can be maintained approximately parallel to the producer well. The target well must be of a higher conductivity than the surrounding formation, which may be realized through the use of an elongated conductive body along the target well, such as, for example, casing which is already present in most wells to preserve the integrity of the well. Also, the method and system of the disclosure are particularly desirable for the drilling of SAGD wells because the two wells can be drilled close to one another as is required in SAGD operations. These and other applications and/or adaptations will be understood by those ordinarily skilled in the art having the benefit of this disclosure.

Figure 1A:
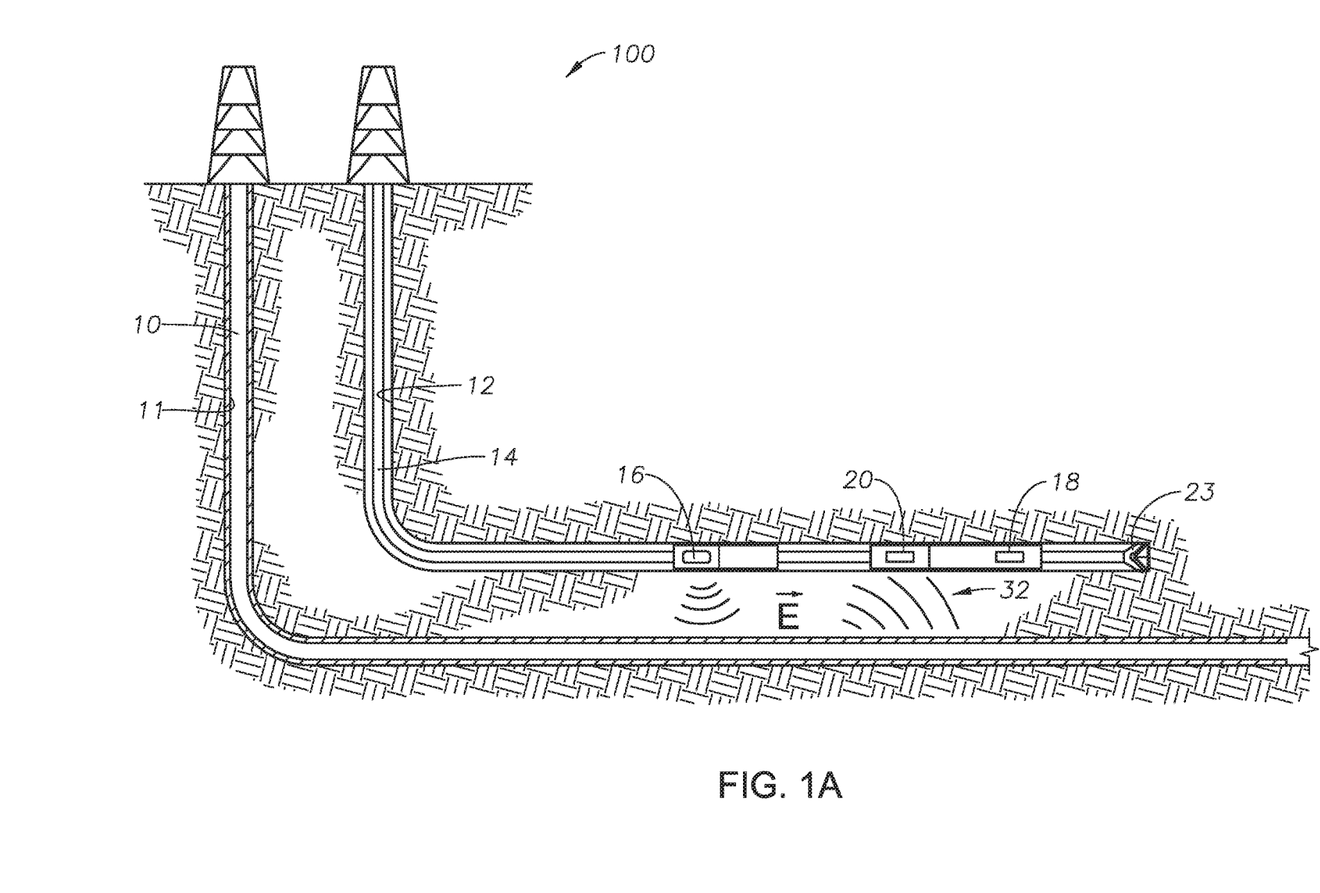
FIGS. 1A and 1B illustrate a relative positioning system according to certain illustrative embodiments of the present disclosure.
Figure 1B:
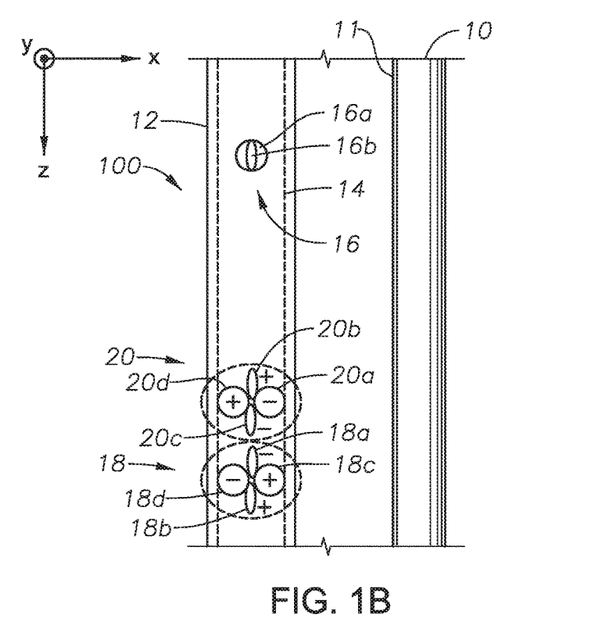

FIGS. 1A and 1B illustrate a relative positioning system 100 according to an exemplary embodiment of the present disclosure. In this embodiment, a producer well 10 is drilled using any suitable drilling technique. Thereafter, producer well 10 is cased with casing 11. An injector well 12 is then drilled using drilling assembly 14 which may be, for example, a logging-while drilling ("LWD") assembly, measurement-while drilling assembly ("MWD") or other desired drilling assembly having a bit 23 at its distal end. Although injector well 12 is described as being subsequently drilled, in other embodiments producer well 10 and injector well 12 may be drilled simultaneously.

In this exemplary embodiment, drilling assembly 14 includes a bottom hole assembly having one or more magnetic dipole transmitters 16 and one or more magnetic dipole receivers 18. In those embodiments utilizing two transmitters 16, the transmitters are positioned in non-parallel directions (orthogonal directions, for example) in relation to one another such that the transmitted fields can be decoupled in two orthogonal directions in order to achieve the measurement of the azimuthal angle of producer well 10. In order to simplify the decoupling process, the transmitters may be positioned in orthogonal relationship to one another. In the following description, the transmitters and receivers may be referred to as being orthogonally positioned in relation to one another; however, in alternative embodiments, the transmitters/receivers may be positioned at other non-parallel orientations relative to one another. As shown in FIG. 1B, drilling assembly 14 includes transmitters 16a, b orthogonally positioned. Thus, in this example, at least four magnetic dipole receivers 18a-d are positioned along drilling assembly 14 in order to take the gradient measurements. The receivers 18a-d are radially separated along drilling assembly 14 such that the gradient field may be measured. In this example, four bucking receivers 20 are positioned adjacent to receivers 18 in order to eliminate the direct signal from transmitters 16.

As will be described in greater detail below, during an exemplary drilling operation using relative positioning system 100, drilling assembly 14 is deployed downhole to drill injector well 12 after, or contemporaneously with, the drilling of producer well 10. In order to maintain injector well 12 at the desired distance and direction from producer well 10, relative positioning system 100 activates transmitters 16 that produce an electric field $\vec{E}$ which induces a current along target casing 11 of producer well 10 that results in a magnetic field 32 radiating from target casing 11. The radially separated receivers 18 then sense the magnetic field 32 and the associated gradient field. Local or remote processing circuitry then utilizes the gradiometric data of the received magnetic field to determine the distance and direction to producer well 10. Once the relative position is determined, the circuitry generates signals necessary to steer the drilling assembly 14 in the direction needed to maintain the desired distance and direction from producer well 10.

Figure 2:
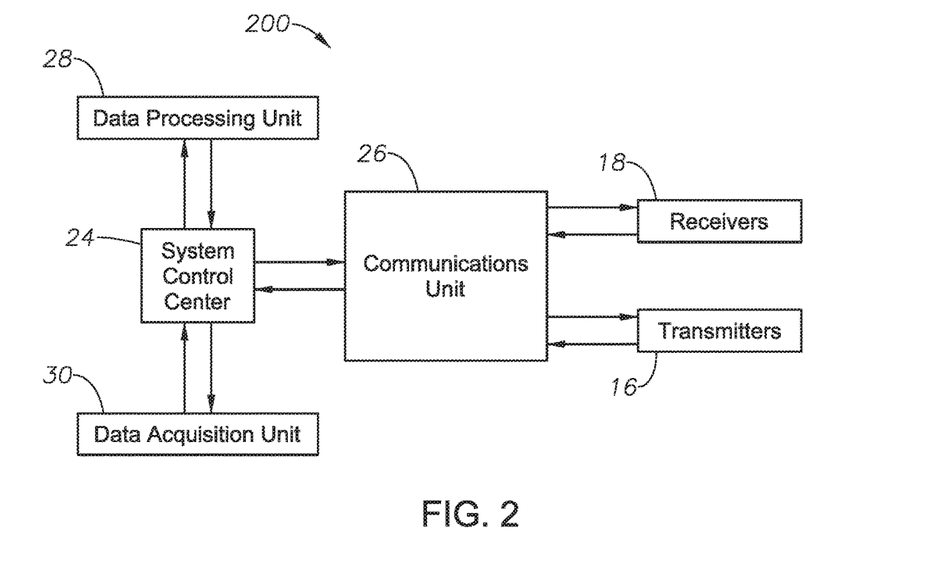
FIG. 2 is a block diagram of processing circuitry utilized in a relative positioning system, according to certain illustrative embodiments of the present invention.

FIG. 2 is a block diagram of processing circuitry 200 utilized in a relative positioning system, according to certain illustrative embodiments of the present invention. A system control center 24 that manages the operational procedures is shown. In this example, transmitters 16 consist of two coils in orthogonal directions to achieve the measurement of the azimuthal angle of producer well 10. In other embodiments, however, transmitters/receivers may be realized as for example, solenoids, magnetometers, or a variety of other realizations that approximate magnetic dipoles. Therefore, receivers 18 may contain at least four coil antennas for the gradient measurements. Elimination of direct signal from transmitters 16 to the receivers 18 may be accomplished using bucking coils 20; in other cases, direct signal elimination may be accomplished using alternative techniques, such as an analytical calculation of this effect. In those embodiments utilizing bucking receivers 20, receivers 18 shown in FIG. 2 would also include data from bucking receivers 20.

Communications unit 26 facilitates the interaction between system control center 24 and transmitter coils 16 & receiver coils 18. A visualization unit (not shown) may be connected to communications unit 26 to monitor the data; for example, an operator may intervene the system operations based on this data. System control center 24 also interacts with one or more data processing units 28 and one or more data acquisition units 30. Data processing unit 28 may convert the received data into information giving the target's position and direction. Thereafter, results may be displayed via the visualizing unit. System control center 24 can be located at the surface or in the well, in which case processed data is communicated to the surface.

As previously mentioned, drilling assembly 14 may include on-board circuitry, along with necessary processing/storage/communication circuitry, to perform the calculations described herein. In certain embodiments, that circuitry is communicably coupled to one or more magnetic dipole transmitters 16 utilized to generate electromagnetic fields, and also likewise coupled to magnetic dipole receivers 28 in order to process the received electromagnetic waves 28. Additionally, the circuitry on-board drilling assembly 14 may be communicably coupled via wired or wireless connections to the surface to thereby communicate data back uphole and/or to other assembly components (to steer a drill bit forming part of assembly 14, for example). In an alternate embodiment, the circuitry necessary to perform one or more aspects of the techniques described herein may be located at a remote location away from drilling assembly 14, such as the surface or in a different wellbore. For example, in certain embodiments, the transmitter may be located in another well or at the surface. These and other variations will be readily apparent to those ordinarily skilled in the art having the benefit of this disclosure.

Although not shown in FIG. 2, the on-board circuitry includes at least one processor and a non-transitory and computer-readable storage, all interconnected via a system bus. Software instructions executable by the processor for implementing the illustrative relative positioning methodologies described herein in may be stored in local storage or some other computer-readable medium. It will also be recognized that the positioning software instructions may also be loaded into the storage from a CD-ROM or other appropriate storage media via wired or wireless methods.

Moreover, those ordinarily skilled in the art will appreciate that various aspects of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Figure 3:
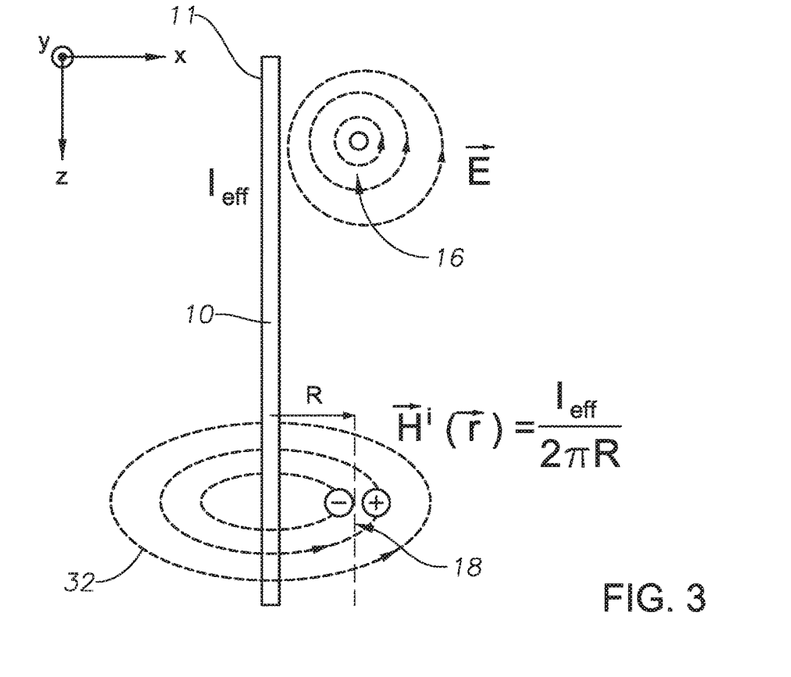
FIG. 3 illustrates a simplified illustrative embodiment of a relative positioning system used to describe a methodology of the present disclosure.

Now that various embodiments have been described, the methodology by which relative positioning is determined will now be described. FIG. 3 illustrates a simplified illustrative embodiment of a relative positioning system that will be used to describe a methodology of the present disclosure. Here, injector well 12 and drilling assembly 14 are not shown for simplicity. Nevertheless, a crossection of a homogeneous formation (save for target well 10, transmitters 16 and receivers 18) in the x-z plane is depicted. In this example, a transmitting coil 16 with a magnetic moment in the y-direction (i.e., a coil that lies in the x-z plane) produces an electric field ($\vec{E}$) around it. A target well 10 whose principle axis is in z-direction is also shown. Wells generally have elongated metallic conductive bodies (such as steel casings) around them to fortify the well structure and prevent collapsing of the borehole wall. Since casing is much more conductive than the formation around it, a strong coupling of the electric field to target casing 11 occurs.

The coupling of the electric field produces a conduction current on target casing 11 which would then induce a magnetic field 32 around casing 11 whose magnitude can be found via the Biot-Savart law. If the induced current was constant, Biot-Savart law would reduce to the Ampere's law. In practical situations, current induced on casing 11 is not constant, but for our purposes we may assume that field at a point $\vec{r}$ is given by:

$$\vec{H}^i(\vec{r}) = \frac{I_{eff}}{2\pi R}\hat{\phi}, \quad \text{Eq. (1)}$$

with little loss of accuracy where H is the magnetic field, $I_{eff}$ is an effective current, and R is the radial distance from target well 10 to point $\vec{r}$.

The gradient of the magnetic field at the same location, $$\frac{\partial \vec{H}^i(\vec{r})}{\partial R},$$

is given by:

$$\frac{\partial \vec{H}^i(\vec{r})}{\partial R} \approx -\frac{I_{eff}}{2\pi R^2}\hat{\phi}. \quad \text{Eq. (2)}$$

By taking the ratios of $\vec{H}^i(\vec{r})$ to $$\frac{\partial \vec{H}^i(\vec{r})}{\partial R},$$

the radial distance to target well 10 can be determined as follows:

$$R = \left|\frac{\vec{H}^i(\vec{r})}{\frac{\partial \vec{H}^i(\vec{r})}{\partial R}}\right|. \quad \text{Eq. (3)}$$

An illustrative design of receivers 18 will now be described. As described herein, the receivers are magnetic dipole realizations such as, for example, coils, solenoids, etc. In one embodiment, coil antennas having a magnetic moment in a certain direction are used. As a result, the coils are only sensitive to the component of the magnetic field in that direction. If this direction is called u, component of magnetic field in that direction can be written as:

$$\vec{H}^i(\vec{r})\cdot\hat{u} = \frac{I_{eff}}{2\pi R}(\hat{\phi}\cdot\hat{u}) \quad \text{Eq. (4)}$$

Similarly, if two receiver coils (with the same magnetic moment) are radially separated by a very close distance in direction v, their difference is a very good approximation to the component of the gradient of the magnetic field in that direction. Assuming u and v are two of the axes in the Cartesian coordinate system, the gradient in direction v can be written as follows:

$$\frac{\partial \vec{H}^i(\vec{r})\cdot\hat{u}}{\partial v} = -\frac{I_{eff}}{2\pi R}[(\hat{v}\cdot\hat{\phi})(\hat{u}\cdot\hat{r}) + (\hat{v}\cdot\hat{r})(\hat{u}\cdot\hat{\phi})]. \quad \text{Eq. (5)}$$

In Cartesian coordinates, $\hat{r}$ and $\hat{\phi}$ can be written as:

$$\hat{r}=\hat{x}\cos(\Phi)+\hat{y}\sin(\Phi)\quad \hat{\phi}=-\hat{x}\sin(\Phi)+\hat{y}\cos(\Phi) \quad \text{Eq. (6),}$$

where Φ is the azimuth angle of receiver 18 with respect to casing 11; that is, the angle between the projection of the measured magnetic field vector onto the x-y plane of the coordinate system of receiver 18 and the y-axis.

If the receiver coils have their magnetic moments in y-direction and they are radially separated in the x-direction as shown in FIG. 3, Equation 5 can be evaluated as:

$$\frac{\partial \vec{H}^i(\vec{r}) \cdot \hat{y}}{\partial x} = -\frac{I_{eff}}{2\pi R} \left[ \frac{\cos(\Phi)}{\sin(\Phi)^2 - \cos(\Phi)^2} \right], \quad \text{Eq. (7)}$$

from which two observations may be made. First, the gradient is zero when Φ is $90° \pm n \times 180°$ ($n \in Z$), which is the case when magnetic field does not have any y component. Second, when Φ is $45° \pm n \times 90°$ ($n \in Z$), the gradient calculation "blows up", preventing the range calculation for this angle.

Figure 4:
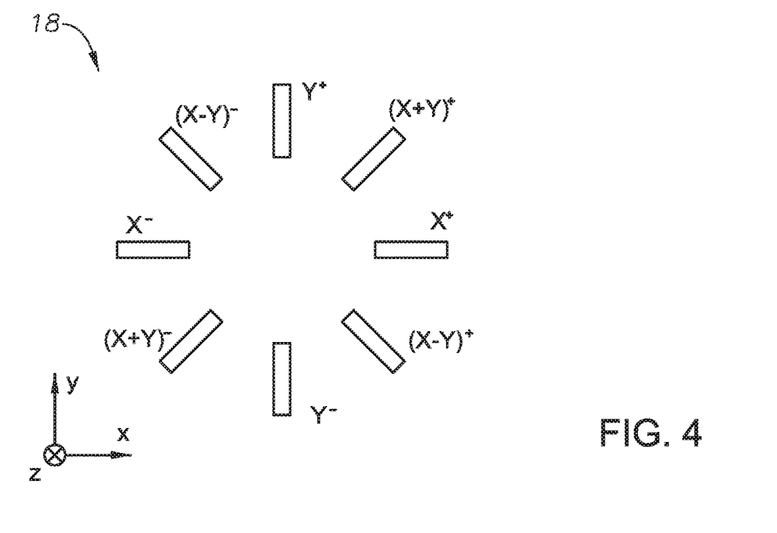
FIG. 4 illustrates a magnetic dipole receiver configuration useful to eliminate blind spots, according to certain illustrative embodiments of the present disclosure.

To prevent the blind spots that are suggested by Equation 7, an illustrative receiver design is shown in FIG. 4, which shows a magnetic dipole receiver configuration useful to eliminate blind spots, according to certain illustrative embodiments of the present disclosure. As shown in FIG. 4, coil receivers 18 are shown as boxes around the body of a bottom hole assembly (not shown) in this figure for illustration purposes. Receivers 18 are named according to the gradient direction. For example, gradient in y-direction can be found by finding the difference of the fields at the radially separated coil Y+ and coil Y-. This configuration will allow gradient measurement to be made in 45° intervals, eliminating any possible blind spots.

Still referring to FIG. 4, it can be seen how that each receiver pair (Y+/Y-, X+/X-, etc.) is radially separated in a direction that is transverse (perpendicular, for example) to the axis of the bottom hole assembly (the axis of the bottom hole assembly is along the z direction.). Therefore, during drilling operations, the magnetic moment of each receiver pair remains oriented in a direction transverse to both the axis of the bottom hole assembly and the direction of the radial separation of the receiver pairs. As a result, the gradient of magnetic field 32 may be measured.

As previously described, bucking receivers 20 are utilized in certain embodiments to eliminate the direct signal from transmitters 16. Bucking receivers 20 are also magnetic dipole realizations, such as coils, solenoids or magnetometers. Determination of the range requires that the magnetic field due to the current induced on target casing 11, as well as its gradient, is measured at a point as given in Equation 3. However, receivers 18 also measure the direct signal created by transmitter 16, complicating the analysis. To eliminate this direct signal, several approaches may be considered. One illustrative approach is calculating the field of transmitter 16 at receivers 18 analytically, and subtract this value from the gradient measurements. Note that this illustrative approach requires knowledge of the formation properties, as will be understood by those ordinarily skilled in this art having the benefit of this disclosure.

An alternative illustrative approach is to utilize bucking receivers 20, which are wound in opposite direction from the receivers 18 and located in such a way that the in-air imaginary component of the direct signal between the receiver 18-bucking receiver 20 combination is cancelled. Although in formations that are different than air, this cancellation is disturbed, in most cases effects are small. To show these effects, consider the example shown in FIG. 5. For simplicity, in this situation, both target casing 11 along well 10, transmitters 16 and receivers 18 lie on the same x-z plane. In other words, in Equation 6, Φ is equal to zero. Thus, consideration of only transmitters 16 and receivers 18 with their magnetic moments in y-direction is enough for range determination.

Figure 5:
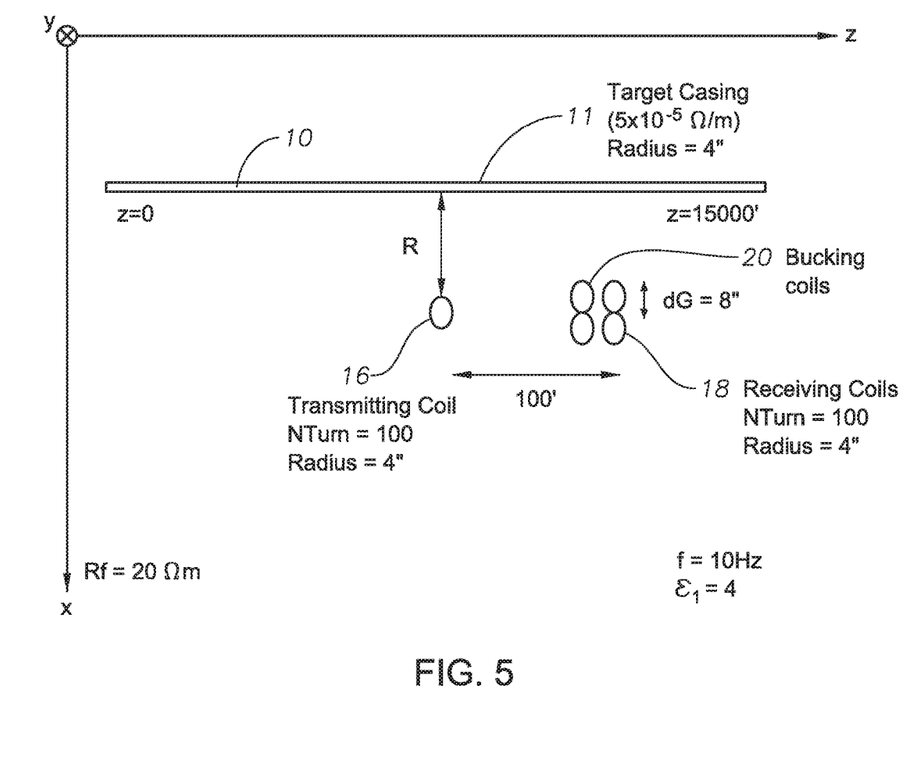
FIG. 5 illustrates a simplified geometry of a simulated relative positioning system, according to certain illustrative embodiments of the present disclosure.

Still referring to the example in FIG. 5, target casing 11 has a 4" radius, and a resistivity per unit length value of $5 \times 10^{-5}$ Ω/m. The length of the illustrative target is 15000 feet. Transmitter coil 16 is assumed to be located directly below the mid-point of target casing 11 at a distance of R as shown in FIG. 5. Transmitter coil 16 has 100 turns and a radius of 4". Receiver coils 18 are at a distance of 100' from transmitter 16 in the z-direction, and they have the same radius and number of turns as transmitter 16. Bucking coils 20, when used, are assumed to be at a distance of 99' from transmitter 16 (and 1' from receivers 18), and their magnetic moments are adjusted such that the direct field cancellation in-air is achieved (Here, it should again be noted that imaginary part of the direct field is canceled, this does not imply the perfect cancellation of real field.). For simplicity, effects of the tool structure (other than the antennas) and the borehole were not considered.

During computer simulations of the illustrative embodiments of the present disclosure, relative dielectric permittivity of the formation was assumed to be 4. In the example below, default formation resistivity was 1 Ω-m (however, a comparison with the case of 20 Ω-m is provided) and the default frequency was 10 Hz (although the case with frequency equal to 1 Hz is also shown.). The example case was simulated using a numerical electromagnetic code.

Figure 6:
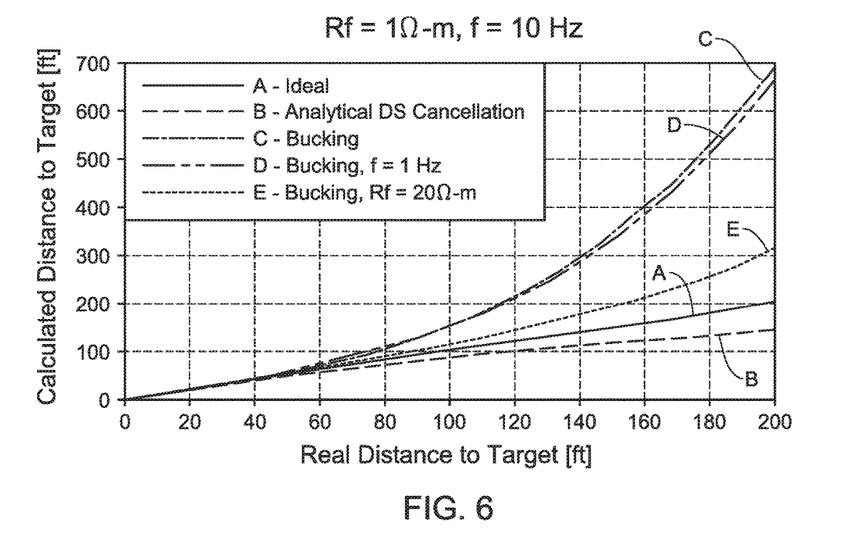
FIG. 6 is a graph plotting the measured distance as a function of the real distance of the tool from the target obtained from simulations of illustrative embodiments of the present invention.

FIG. 6 is a graph plotting the measured distance as a function of the real distance of the tool from the target obtained from simulations of illustrative embodiments of the present invention. Ideal case (i.e., measured distance equal to the real distance) is shown with line A. Line B depicts the case when analytical direct signal cancellation is employed for distance cancellation. Note that even in this case, as the distance from the casing gets greater (compared to transmitter-receiver spacing), results begin to deviate from the ideal. This is due to the violation of the constant current assumption. Nevertheless, results are almost identical with the ideal case up to around 50' (half the distance between transmitter and receiver).

Line C depicts the same case when direct signal elimination is accomplished by bucking. Although results are worse, accuracy improves drastically as the tool gets closer to the target where the highest accuracy is needed if the target is to be intersected or to be avoided. Results when the operational frequency is decreased to 1 Hz is shown with Line D. In this case, direct signal cancellation is better but a substantial improvement could not be achieved. Finally, case when bucking is used in a 20 Ω-m formation is shown with Line E. In this case, bucking works much better and results are a much closer to the ideal.

As seen from Equation 7, the direction to the target should be known for range calculation. The direction information is also needed to determine the drilling direction in intersection applications. Therefore, illustrative embodiments of the present disclosure also propose different methodologies by which to determine direction. In one example, utilizing external information from another tool (electrode excitation ranging tool, surface excitation, etc.) is one such possibility. In an alternate embodiment, the gradient field 32 in FIG. 4 may be utilized. By taking the angle between the orthogonal components of the gradient receiver coil pair, the direction of the target may be determined. Any ambiguity in angle is also eliminated since the sign of the gradient tells whichever of the two coils that are used to determine the gradient in that direction is closest to the target. Unfortunately, the gradient signal is small, thus this approach may lead to large errors in angle determination when the signal is weak (i.e., faraway from the target where accurate direction determination is important to approach the target rather than get away from it.)

In yet another illustrative approach, the total field may be utilized. Here, the angle between x and y components of the gradient field will give the direction of the target. However, this angle may be between 0° and 90°, thus presenting a large ambiguity. Nevertheless, if the cross-coupling components in the total field are also considered, this range can be extended from 0° to 180°. An example implementation is realized using:

$$\Phi = \left| \tan^{-1}\left( \frac{H_{XX} - H_{YX}}{H_{YY} - H_{XY}} \right) \right|;$$  Eq. (8)

If $\text{Re}\{H_{YX} + H_{XY}\} < 0$ $$\Phi = 180° - \left| \tan^{-1}\left( \frac{H_{XX} - H_{YX}}{H_{YY} - H_{XY}} \right) \right|; o.w..$$

Note that signs of the fields in this equation depend on the particular convention used. In Equation 8, $H_{ij}$ refers to the field measured by the receiver with magnetic moment in direction j corresponding to the transmitter in direction i. The 180° ambiguity can then be eliminated by using either the gradient information or looking at the temporal change of the calculated range. In general, some apriori information about the position of the target should be available as well, thus this ambiguity is not a huge concern in most practical cases.

Figure 7:
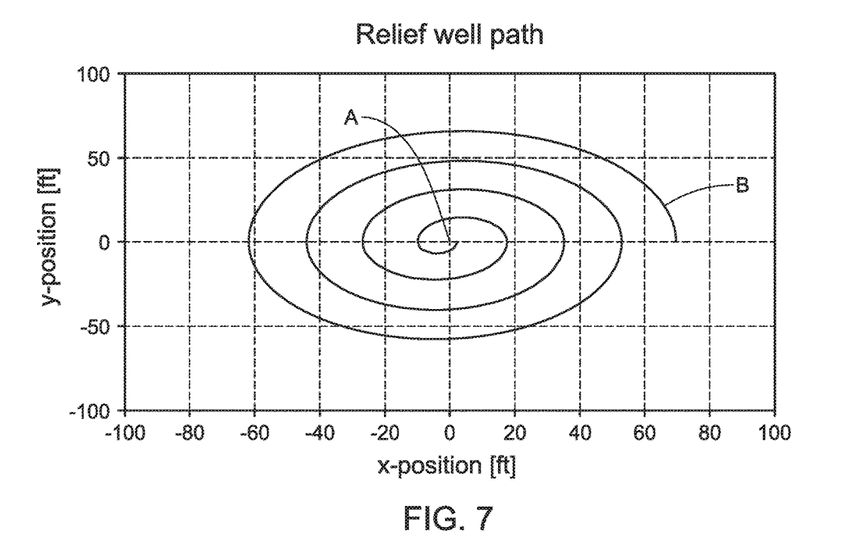
FIG. 7 illustrates the path of a relief well drilled to intersect a blownout well, according to illustrative methodologies of the present invention.

A two dimensional example is useful in demonstrating the application of direction information into ranging. Consider the case of intersecting a blown out well by a relief well. FIG. 7 illustrates a path that the illustrative relief well may follow. In this figure, the blown out well is assumed to be at the center A of the coordinate system lying in z-direction, and the relief well B follows a helical path in order to intersect it. It is assumed that relief well B remains parallel to blownout well A during the operation. Simulation parameters are those shown in FIG. 5; however, formation resistivity is selected to be 20 Ω-m. Also, dG (distance between gradient coils) is √2 times 8" for the gradient operation in (x+y) and (x−y) directions, while it remains 8" for x- and y-directed gradients.

Figure 8:
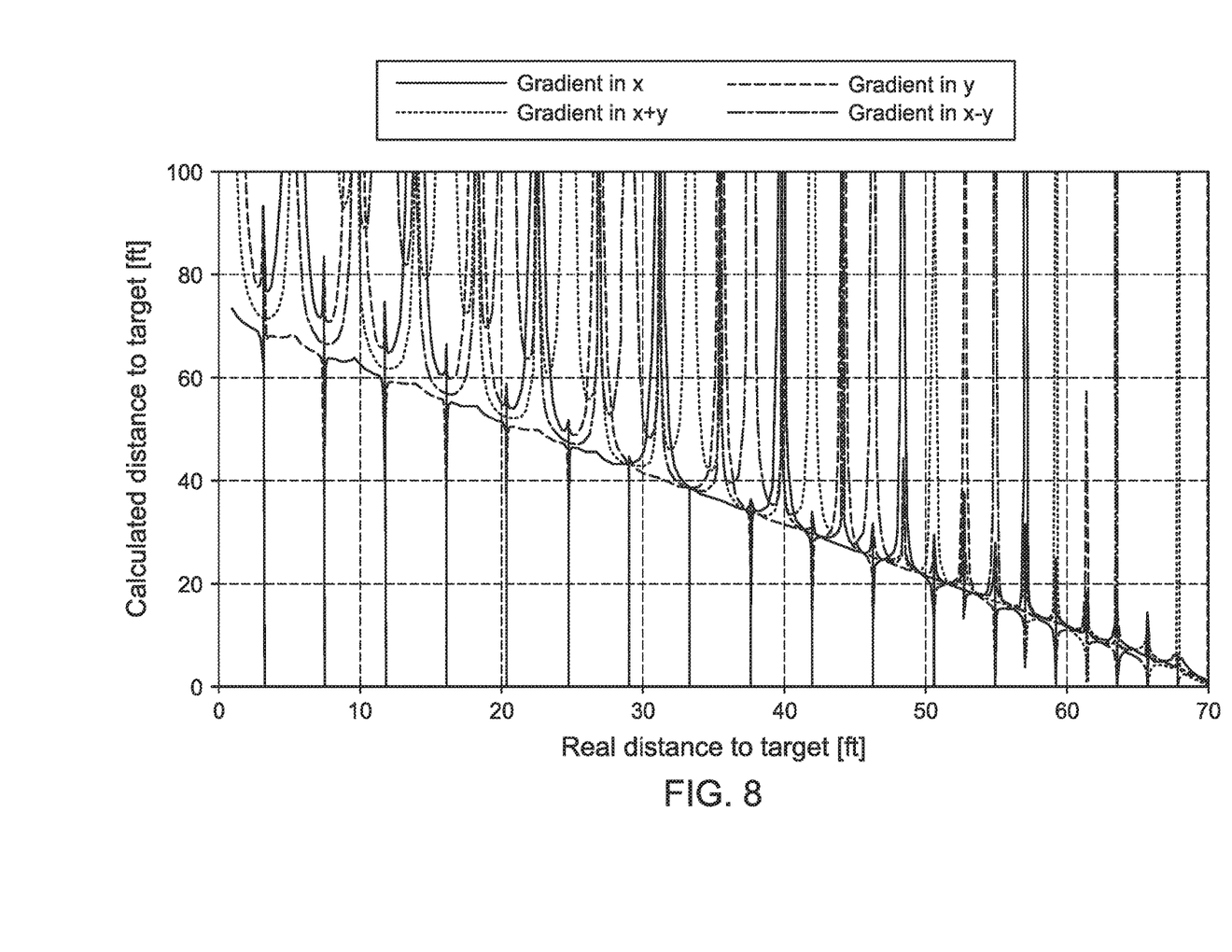
FIG. 8 plots the calculated distance from relief well to a blownout well versus the real distance for gradient measurements in different directions, according to illustrative methodologies of the present invention.

FIG. 8 plots the calculated distance from relief well B to blownout well A versus the real distance for gradient measurements in different directions. The measured distance to the casing for gradient measurements in x (A), y (B), x+y (C) and x−y (D) directions as a function of real distance between the relief well and the blownout well is shown. Direction to target was calculated using the total field method described above. This direction information is also used in the range calculation as in Equation 7. As expected, gradients in different directions are not accurate at all distances; since the azimuth angle Φ with respect to the target changes with distance. However, it is possible to select the most accurate distance using the azimuth information. One example of how to select the most accurate distance component is given as follows:

Use gradient in x direction; If mod(Φ,180)
≤22.5°|mod(Φ,180)>157.5°

Use gradient in (x+y) direction; If mod(Φ,180)
>22.5° & mod(Φ,180)≤67.5°

Use gradient in y direction; If mod(Φ,180)>67.5° &
mod(Φ,180)≤112.5°

Use gradient in (x−y) direction; If mod(Φ,180)
>112.5° & mod(Φ,180)≤157.5°  Eq. (9).

Figure 9:
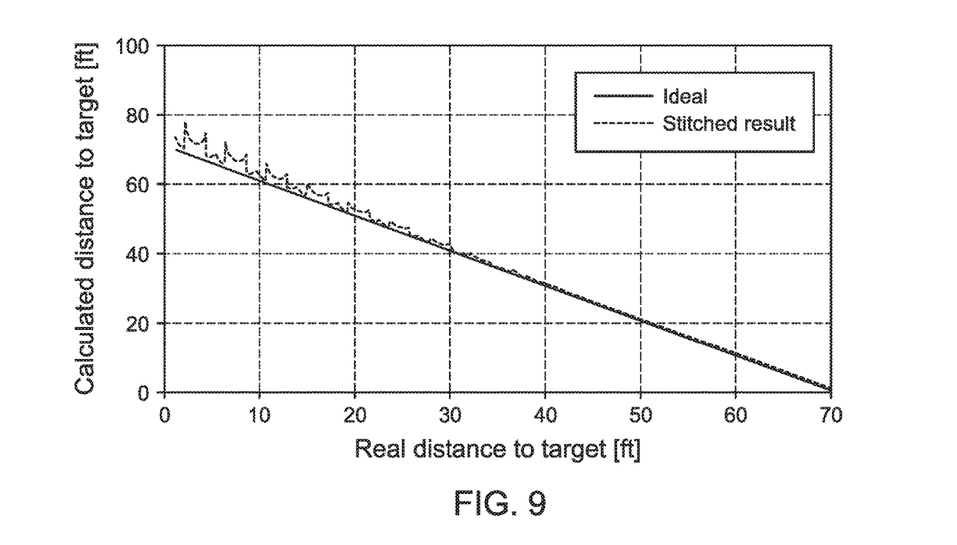
FIG. 9 plots the distance to target result from the four gradient measurements shown in FIG. 8.

Using this selection criterion for the results shown in FIG. 8, a single distance to target result may be obtained as shown in FIG. 9. This result is shown in the "stitched" result line. For comparison, ideal case is shown as a solid line. It can be seen that stitched results are a good approximation to the real distance and this approximation gets more accurate as the target is approached.

Figure 10:
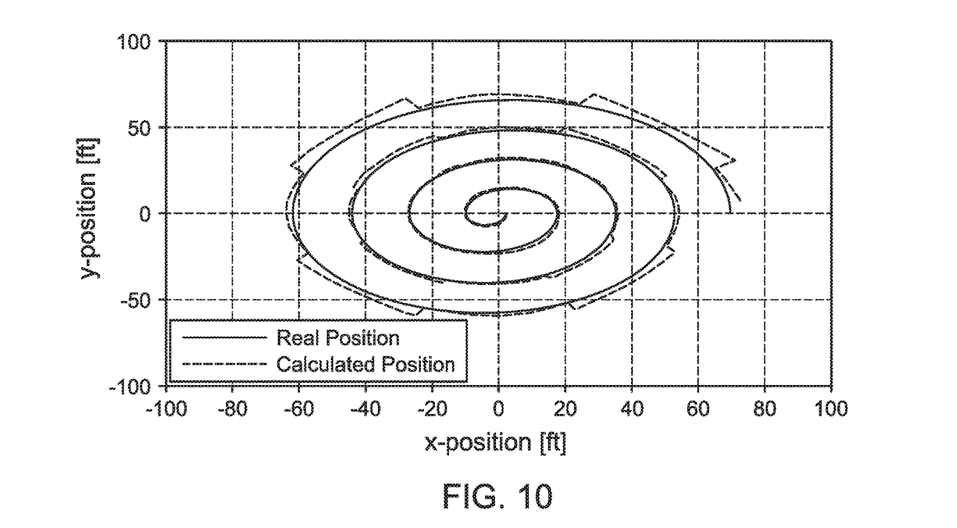
FIG. 10 plots the real path of the relief well versus the calculated path for an illustrative well-intersection methodology of the present disclosure.

Note that Equation 9 allows azimuth angle Φ to be known with a 180° ambiguity. Thus, the angle found using Equation 8 can be directly used to produce FIG. 9. However, if apriori information is available or gradient information is used to eliminate the 180° ambiguity, FIG. 7 can be reproduced with the calculated path (dashed line) as shown in FIG. 10, which illustrates the real path of the relief well versus the calculated path for the well-intersection example. Here, it clearly illustrates how the calculated position gets more accurate as target well gets closer.

Figure 11:
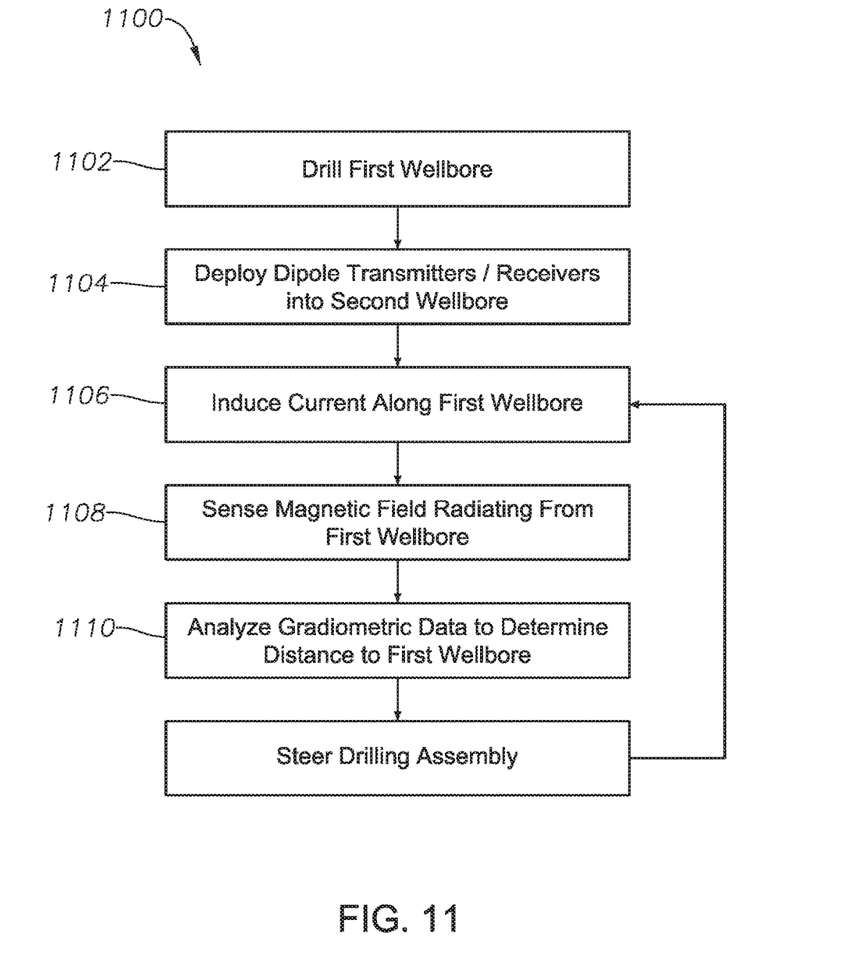
FIG. 11 is a flow chart of a ranging method employed by a relative positioning system to determine the distance between a first (i.e., target) and second wellbore, according to certain illustrative methodologies of the present invention.

Now that various embodiments have been described, the methodology by which the well distances are determined will now be described. As previously described, illustrative relative positioning systems generally consist of magnetic dipole realizations (transmitters and receivers) positioned to induce and measure gradient magnetic fields propagating from a target wellbore. FIG. 11 is a flow chart of a ranging method 1100 employed by a relative positioning system that utilizes gradiometric data to determine the distance between a first (i.e., target) and second wellbore, according to certain illustrative methodologies of the present invention. Again, the specific application may be, for example, a SAGD or intersection application.

Nevertheless, at block 1102, a first wellbore is drilled using any suitable methodology. The first wellbore has a higher conductivity than the surrounding formation which, for example, may be achieved using the casing of the first wellbore or through utilization of some other elongated conductive body positioned along the first wellbore. At block 1104, at least two magnetic dipole transmitters and at least four magnetic dipole receivers are deployed into a second wellbore. The receivers are radially separated along the axis of the bottom hole assembly. The transmitters and receivers may be deployed in the second wellbore in a variety of ways including, for example, along a drilling assembly utilized in a SAGD operation or a subsea operation. Note that in alternative methodologies, the first and second wellbores may be drilled contemporaneously.

At block 1106, the transmitters are excited to thereby induce a current along the first wellbore that results in a magnetic field radiating from the first wellbore. At block 1108, the magnetic field is then received using the receivers. At block 1110, using processing circuitry operationally coupled to the receivers, the relative positioning system utilizes the gradiometric data of the received magnetic field to determine the distance between the first and second wellbores. More specifically, here the receivers measure the gradient field of the received magnetic field in a radial direction along the bottom hole assembly. After analyzing the gradient field, the relative positioning system determines what actions, if any, are necessary to maintain or correct the desired drilling path. Such actions may be, for example, a change in direction, speed, weight on bit, etc. Thereafter, the algorithm returns to block 1106 where it continues to excite the transmitters to continuously monitor and/or adjust the drill path as necessary.

Accordingly, embodiments of the present disclosure described herein utilize magnetic dipole transmitters/receivers to analyze gradient measurements to thereby calculate the distance between a first and second well, without the need to know formation and target properties. As a result, the disclosed ranging system offers an accurate measurement of the range to a target via widely available and easy to build coil antennas. Furthermore, methods to eliminate the direct signal between transmitter and receiver coils have also been disclosed to facilitate a practical implementation of this tool.

Embodiments and methods described herein further relate to any one or more of the following paragraphs:

1. A method for downhole ranging, the method comprising drilling a first wellbore, the first wellbore comprising an elongated conductive body, deploying at least two magnetic dipole transmitters and at least four magnetic dipole receivers in a second wellbore, inducing a current along the first wellbore using the transmitters that results in a magnetic field being emitted from the first wellbore, receiving the magnetic field utilizing the receivers, wherein a gradient field is measured in a radial direction along the second wellbore, and utilizing the gradient field to thereby determine a distance between the first and second wellbores.
2. A method as defined in paragraph 1, further comprising determining a direction of the first wellbore in relation to the second wellbore, wherein determining the direction comprises: determining a total field of the received magnetic field; determining an angle between x and y components of the total field; and utilizing the angle to determine the direction.
3. A method as defined in paragraphs 1 or 2, further comprising utilizing the gradient field to determine a direction of the first wellbore in relation to the second wellbore.
4. A method as defined in any of paragraphs 1-3, wherein determining the direction further comprises determining an angle between orthogonal components of the gradient field; and utilizing the angle to determine the direction.
5. A method as defined in any of paragraphs 1-4, wherein determining the distance between the first and second wellbores further comprises eliminating a direct signal emitted from the transmitters.
6. A method as defined in any of paragraphs 1-5, wherein the elimination of the direct signal comprises calculating a magnetic field of the transmitters at the receivers; and subtracting the calculated magnetic field from the received magnetic field.
7. A method as defined in any of paragraphs 1-6, wherein the elimination of the direct signal comprises utilizing at least four bucking receivers to cancel an imaginary component of the direct signal.
8. A method as defined in any of paragraphs 1-7, wherein the at least four receivers are two pairs of magnetic dipole receivers, and determining the distance and direction further comprises radially positioning two receivers of the pairs in opposite directions in relation to a measurement center in the second wellbore and determining the gradient field in a desired direction by calculating a difference between magnetic fields at each receiver of the pairs.
9. A method as defined in any of paragraphs 1-8, wherein the first wellbore is a producer well; and the second wellbore is an injector well, wherein the method is utilized in a Steam Assisted Gravity Drainage operation.
10. A method as defined in any of paragraphs 1-9, wherein the first wellbore is a blow out well; and the second wellbore is a relief well.
11. A method as defined in any of paragraphs 1-10, wherein the transmitters and receivers are deployed along a drilling assembly, logging assembly or wireline assembly, the receivers being radially positioned around a body of the drilling, logging or wireline assembly.
12. A method as defined in any of paragraphs 1-11, further comprising steering a drilling assembly deployed along the second wellbore using the determined distance between the first and second wellbores.
13. A method as defined in any of paragraphs 1-12, further comprises avoiding the first wellbore using the distance determination.
14. A downhole ranging assembly, comprising a bottom hole assembly comprising: at least two magnetic dipole transmitters; and at least four magnetic dipole receivers radially positioned around an axis of the bottom hole assembly; and processing circuitry to implement a method comprising: inducing a current along a first wellbore using the transmitters that results in a magnetic field being emitted from the first wellbore; receiving the magnetic field utilizing the receivers, wherein a gradient field is measured in a radial direction along the bottom hole assembly; and utilizing the gradient field to thereby determine a distance between the first and second wellbores.
15. A downhole ranging assembly as defined in paragraph 14, further comprising four bucking receivers positioned along the bottom hole assembly between the transmitters and receivers.
16. A downhole ranging assembly as defined in paragraphs 14 or 15, wherein the bucking receivers comprise an opposite polarization in relation to the receivers.
17. A downhole ranging assembly as defined in any of paragraphs 14-16, wherein the bottom hole assembly is a drilling, wireline, or logging assembly.
18. A downhole ranging assembly as defined in any of paragraphs 14-17, wherein the transmitters are positioned in non-parallel relationship to one another along the bottom hole assembly; the receivers are radially separated in a direction perpendicular to the axis of the bottom hole assembly; and a magnetic moment of the receivers is oriented in a direction perpendicular to both the axis of the bottom hole assembly and the direction of radial separation.
19. A downhole ranging assembly as defined in any of paragraphs 14-18, further comprising eight receivers positioned radially around the body of the bottom hole assembly at 45 degree intervals.
20. A downhole ranging assembly as defined in any of paragraphs 14-19, wherein the transmitters and receivers comprise at least one of a coil, solenoid, or magnetometer.

Moreover, the methodologies described herein may be embodied within a system comprising processing circuitry to implement any of the methods, or a in a computer-program product comprising instructions which, when executed by at least one processor, causes the processor to perform any of the methods described herein.

Although various embodiments and methodologies have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method for downhole ranging, the method comprising:
drilling a first wellbore, the first wellbore comprising an elongated conductive body;
deploying at least two magnetic dipole transmitters and at least four magnetic dipole receivers in a second wellbore;
inducing a current along the first wellbore using the transmitters that results in a magnetic field being emitted from the first wellbore;
receiving the magnetic field utilizing the receivers, wherein a gradient field is measured in a radial direction along the second wellbore; and
utilizing the gradient field to thereby determine a distance between the first and second wellbores.

2. A method as defined in claim 1, further comprising determining a direction of the first wellbore in relation to the second wellbore, wherein determining the direction comprises:
determining a total field of the received magnetic field;
determining an angle between x and y components of the total field; and
utilizing the angle to determine the direction.

3. A method as defined in claim 1, further comprising utilizing the gradient field to determine a direction of the first wellbore in relation to the second wellbore.

4. A method as defined in claim 3, wherein determining the direction further comprises:
determining an angle between orthogonal components of the gradient field; and
utilizing the angle to determine the direction.

5. A method as defined in claim 1, wherein determining the distance between the first and second wellbores further comprises eliminating a direct signal emitted from the transmitters.

6. A method as defined in claim 5, wherein the elimination of the direct signal comprises:
calculating a magnetic field of the transmitters at the receivers; and
subtracting the calculated magnetic field from the received magnetic field.

7. A method as defined in claim 5, wherein the elimination of the direct signal comprises utilizing at least four bucking receivers to cancel an imaginary component of the direct signal.

8. A method as defined in claim 3, wherein the at least four receivers are two pairs of magnetic dipole receivers, and determining the distance and direction further comprises:
radially positioning two receivers of the pairs in opposite directions in relation to a measurement center in the second wellbore; and
determining the gradient field in a desired direction by calculating a difference between magnetic fields at each receiver of the pairs.

9. A method as defined in claim 1, wherein:
the first wellbore is a producer well; and
the second wellbore is an injector well,
wherein the method is utilized in a Steam Assisted Gravity Drainage operation.

10. A method as defined in claim 1, wherein:
the first wellbore is a blow out well; and
the second wellbore is a relief well.

11. A method as defined in claim 1, wherein the transmitters and receivers are deployed along a drilling assembly, logging assembly or wireline assembly, the receivers being radially positioned around a body of the drilling, logging or wireline assembly.

12. A method as defined in claim 1, further comprising steering a drilling assembly deployed along the second wellbore using the determined distance between the first and second wellbores.

13. A method as defined in claim 12, further comprises avoiding the first wellbore using the distance determination.

14. A downhole ranging system comprising processing circuitry to implement the method in claim 1.

15. A downhole ranging assembly, comprising:
a bottom hole assembly comprising:
at least two magnetic dipole transmitters; and
at least four magnetic dipole receivers radially positioned around an axis of the bottom hole assembly; and
processing circuitry to implement a method comprising:
inducing a current along a first wellbore using the transmitters that results in a magnetic field being emitted from the first wellbore;
receiving the magnetic field utilizing the receivers, wherein a gradient field is measured in a radial direction along the bottom hole assembly; and
utilizing the gradient field to thereby determine a distance between the first and second wellbores.

16. A downhole ranging assembly as defined in claim 15, further comprising four bucking receivers positioned along the bottom hole assembly between the transmitters and receivers.

17. A downhole ranging assembly as defined in claim 16, wherein the bucking receivers comprise an opposite polarization in relation to the receivers.

18. A downhole ranging assembly as defined in claim 15, wherein the bottom hole assembly is a drilling, wireline, or logging assembly.

19. A downhole ranging assembly as defined in claim 15, wherein:
the transmitters are positioned in non-parallel relationship to one another along the bottom hole assembly;
the receivers are radially separated in a direction perpendicular to the axis of the bottom hole assembly; and
a magnetic moment of the receivers is oriented in a direction perpendicular to both the axis of the bottom hole assembly and the direction of radial separation.

20. A downhole ranging assembly as defined in claim 15, further comprising eight receivers positioned radially around the body of the bottom hole assembly at 45 degree intervals.

21. A downhole ranging assembly as defined in claim 15, wherein the transmitters and receivers comprise at least one of a coil, solenoid, or magnetometer.

* * * * *